(12) United States Patent
Mrsny

(10) Patent No.: US 6,590,146 B1
(45) Date of Patent: Jul. 8, 2003

(54) COLLECTION DEVICE FOR DEPOSITING REFUSE FOR DISPOSAL

(76) Inventor: Corrine Gonzales Mrsny, 1547 Ames St., Lakewood, CO (US) 80214

(*) Notice: Subject to any disclaimer, the term of this patent is extended or adjusted under 35 U.S.C. 154(b) by 0 days.

(21) Appl. No.: 10/064,446

(22) Filed: Jul. 15, 2002

(51) Int. Cl.[7] .............................................. E03D 11/02
(52) U.S. Cl. ............................................ 84/420; 4/300
(58) Field of Search ........................... 4/300, 319, 420, 4/420.5

(56) References Cited

U.S. PATENT DOCUMENTS

| | | | |
|---|---|---|---|
| 1,459,713 A | * 6/1923 | Beggs | 4/319 X |
| 1,740,860 A | 12/1929 | Hansen | |
| 2,204,416 A | 6/1940 | Kramer | 119/15 |
| 2,464,580 A | 3/1949 | Johnson | 119/1 |
| 3,019,453 A | 2/1962 | Radcliffe | 4/249 |
| 3,276,427 A | 10/1966 | Edwards | 119/1 |
| 3,564,619 A | * 2/1971 | Magathan | 4/319 |
| 3,601,821 A | 8/1971 | Corsiglia | 4/116 |
| 3,818,865 A | 6/1974 | Sinclair | 119/1 |
| 3,835,812 A | 9/1974 | Edwards | 119/1 |
| 3,964,437 A | 6/1976 | Brown | 119/1 |
| D244,701 S | 6/1977 | Knochel et al. | D30/99 |
| 4,117,555 A | 10/1978 | Dennis | 4/1 |
| 4,196,693 A | 4/1980 | Unversaw | 119/1 |
| 4,228,554 A | 10/1980 | Tumminaro | 119/1 |
| 4,975,989 A | 12/1990 | Sutton | 4/300 |
| 5,868,447 A | 2/1999 | Clark et al. | 294/1.4 |

FOREIGN PATENT DOCUMENTS

GB 2275698 * 9/1994 .................... 4/319

* cited by examiner

*Primary Examiner*—Robert M. Petsuga
(74) *Attorney, Agent, or Firm*—Roger A. Jackson

(57) ABSTRACT

A collection device residing in an exterior environment for depositing refuse for disposal with the refuse material removed from a surface and then deposited into the collection device using a pressurized fluid flow to dispose of the refuse material by transferring the refuse material and the fluid to a sewer system. The collection device includes a pedestal body with a first end, a second end, and an internal void. Also included is a receptacle with a base, a surrounding sidewall extending from the base to define a receptacle interior separated from the exterior environment, the sidewall terminates in an opening forming a receptacle rim. The sidewall has a sidewall aperture adjacent to the opening, that receives fluid flow from a nozzle located in the exterior environment positioned to direct the pressurized fluid to flow from the nozzle into the sidewall aperture over an open gap.

22 Claims, 5 Drawing Sheets

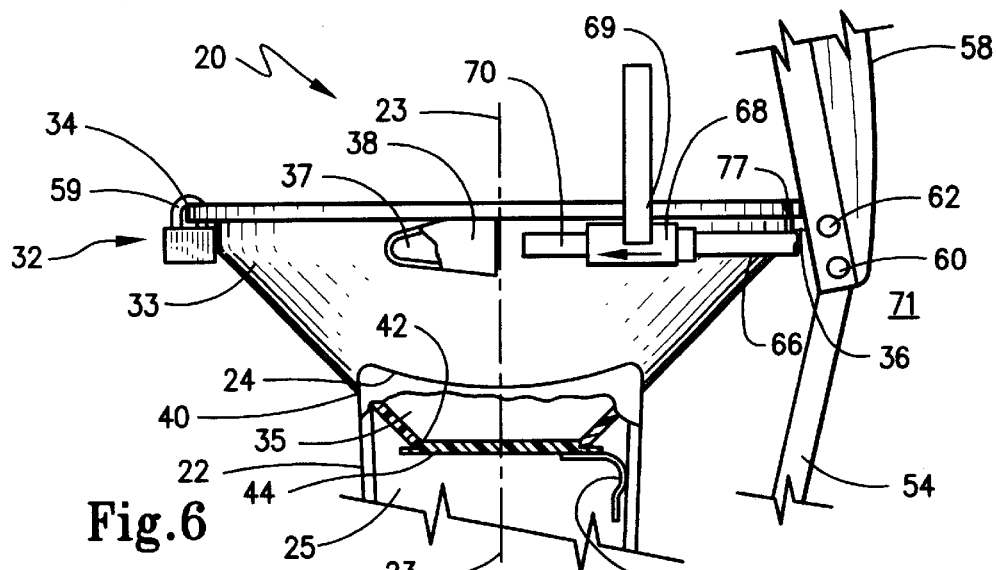
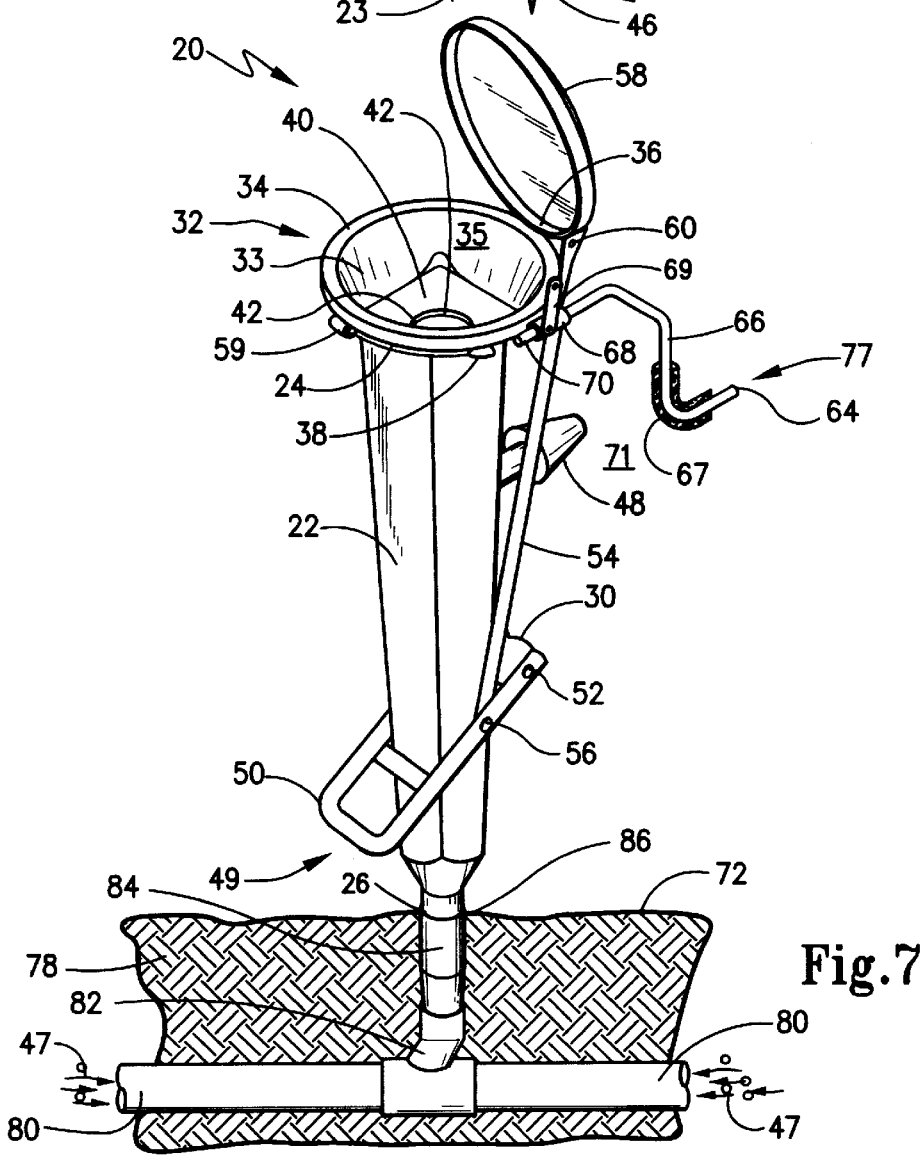

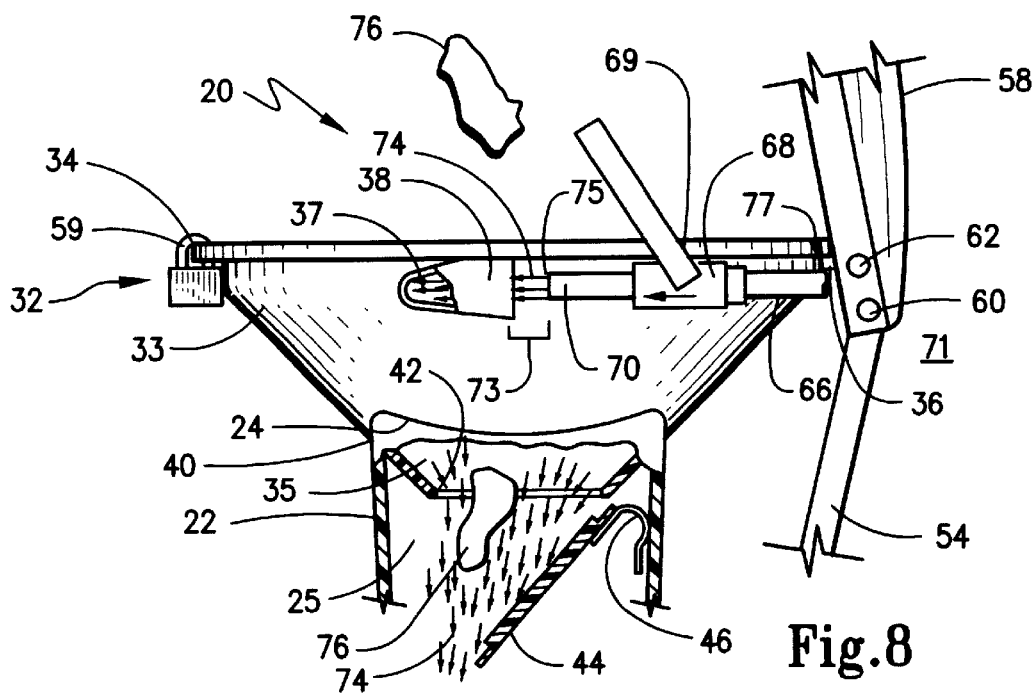
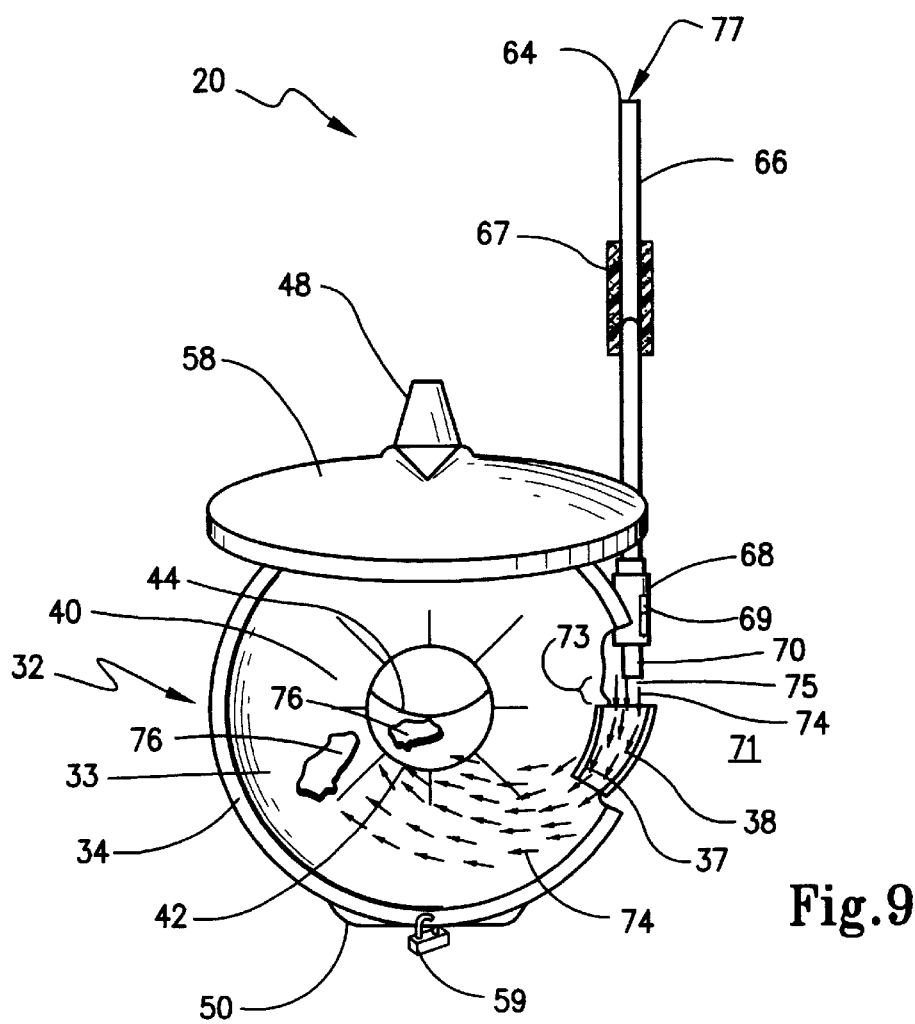

COLLECTION DEVICE FOR DEPOSITING REFUSE FOR DISPOSAL

TECHNICAL FIELD

The present invention broadly concerns devices, which may be used to deposit, refuse collected from a surface for disposal of the refuse. More particularly, the present invention concerns the manual collection of animal excrement from a surface on which a person walks such as a lawn area, a sidewalk, a driveway, a patio, and the like. The present invention specifically concerns the pick-up and removal of pet excrement.

BACKGROUND OF INVENTION

Many human activities generate debris and waste of a wide variety of type. The management of waste through collection and disposal has increasingly become a concern to many cultures not only from a standpoint of living condition aesthetics, but more importantly for hygienic reasons. Not only is the disposal of waste generated by humans of concern to the hygienic environment, but also the collection and removal of animal refuse or excrement, particularly that excrement generated by pets. For example, dogs and cats are common domestic companions of many persons; removal of these animals" excrement or fecal material is necessary for a sanitary environment. Such fecal material may be deposited by the pet in both designated toilet areas for the animal and in more public areas when the animal is either allowed to roam free or is walked by its owners.

Indeed, many communities have enacted rules and regulations requiring pet owners to collect the fecal material from their animals or any other animal fecal material that may be deposited with in a designated area, typically a surface area that is defined as a yard of a particular property owner or property lessee. Naturally, deposit of such pet or animal fecal material occurs, since the animals are relatively uninhibited by any toilet habits when the animal is out of doors in a designated area. When the animal utilizes and a yard or private lawn or a "run" as a toilet location, the presence of fecal material creates a non-hygienic situation, especially since the yard area is typically shared by children who use the yard area as a play area. Should the fecal material reside in such areas even for a short duration, such presence the attracts undesired insects such as flies and the like, and bacterial contamination which further exacerbates the unsanitary conditions along with the resulting unpleasant odors. In addition, the fecal material itself can make an unsightly brown or dead spots in the lawn and could cause additional problems should parasites be present in the fecal material. For these reasons, sanitary conditions demand that fecal material be removed in a timely matter from the animal's toilet area. This toilet area can cover anywhere that the animal can have a presence such as a line, a sidewalk, a driveway, a patio, or the like.

Many individuals find that the collection and disposal of animal excrement to be quite an undesirable or unpleasant task also, if this task is undertaken in properly such collection and disposable of the animal excrement can be unhealthy. Accordingly, many individuals resort either to wearing some type of protective gloves while collecting the fecal material or engage in the use of some sort of scooping implement to accomplish the collection portion of the task, in other words removing the pet excrement from the surface. Additionally, in the case of cat litter, many individuals utilize a slotted scoop, which allows the user to remove fecal material from the cat litter box while the particular litter falls through the slots and a scoop for reuse by the cat. The other portion of this unpleasant task concerns the disposal of the fecal material, wherein typically the fecal material is deposited in a trashcan. The deposit of the fecal material in the trashcan has its own attendant problems in that the fecal material in the trash can attracts undesired insects such as flies and the like, and results in bacterial contamination, and unpleasant odors which further exacerbates the unsanitary conditions.

Focusing on the disposal portion of this unpleasant task, it is surprising that there are few commercial products that are currently available for the sanitary removal of animal fecal material. There are a few prior art examples of water closets or toilets adapted for animal fecal material disposal. An example would be U.S. Pat. No. 4,975,989 to Sutton that discloses an enclosure that acts to funnel to direct animal fecal material from a depository aperture into a flushing cistern that works much like a human fecal material toilet to dispose of the animal fecal material. Sutton recommends that the animal fecal material be placed in a disposable paper bag prior to the fecal material being deposited in the aperture. This is necessary because there is a communication trough from the aperture to the toilet wherein the fecal material would adhere to the sides of the communication trough if it were not placed in a disposable paper bag, thus the aforementioned problems of placing the excrement in a trash can would exist within the communication trough. Any attempt to sanitize or clean the communication trough which would be required without the use of the disposable paper bag would be quite difficult as the trough is long and narrow making access in and to the interior of the trough difficult. Sutton's remedy to the identified problem, however, requires that the excrement be placed into the disposable paper bag and that a supply of disposable paper bags to present thus, adding unnecessary complication to an already undesirable task. Sutton also recommends that the disposable paper bag have a glued edge portion to further allow the bag to be sealed prior to its deposit into the aperture, again making for the requirement of a specialized disposable paper bag that is not only sealable but must be highly water soluble so as to not plug up the sewer system.

Another prior example is U.S. Pat. No. 4,117,555 to Dennis that discloses a canine toilet where in the dog actually stands on the toilet and defecates into an opening with the flushing system of the toilet coming into operation once the dog stands on the appropriate platform. There is also included a "piddle post" for the dog to position itself while assuming the typical three leg stance with one hind leg raised into the air for the dog (male in this case) to urinate against the "piddle post" wherein the urine will flow into the toilet. While this is an admirable invention, it makes the assumption that the dog will use the toilet properly and certainly for a well-trained dog this may be possible, however, it is probably an unrealistic expectation that all dogs can be trained to use the toilet properly especially in the case of puppies, stray animals, or older dogs. Thus, there will still be an unavoidable amount of animal fecal material that is deposited around the yard that will have to be cleaned up in a conventional manner with the attendant aforementioned problems of fecal collection and disposal. Other prior art examples that are similar in function to Dennis in that a specially designed toilet apparatus or device is employed to accommodate the animal, U.S. Pat. No. 2,204,416 to Kramer discloses a dog house like enclosure having a bottom tray with a water flush that is activated by the animal entering and exciting the enclosure in an attempt to collect and dispose of the animal fecal material. Another example would be U.S. Pat. No. 4,228,554 to Tumminaro which discloses a special the animal toilet, however, the requires a human individual to flush the fecal material from the toilet. Further examples of animal toilets also include U.S. Pat. No. 3,818, 865 to Sinclair which discloses an animal toilet that is not connected to a sewer system and would still require manual disposal of the fecal material and U.S. Pat. No. 3,835,812 to Edwards that discloses an animal toilet and includes a mechanical wiping action of the bowl to overcome the problem of the dog not centering itself over the toilet when the dog defecates. These aforementioned patents all have the same problem as Dennis in that they assume the animal can be completely trained to utilize the special toilet.

Accordingly, there has been a long recognized problem to minimize the unpleasant task of collecting and disposing of animal fecal material, given that the collection portion of the unpleasant task as unlikely to change anytime in the near future due to the nature of an animal defecating on a random basis anywhere over a particular surface area, there is a significant and long felt need for an improved device that focuses upon the disposal portion of this unpleasant task without the need for any special physical collection implements, tools, or any special container devices required for disposing of the fecal material.

SUMMARY OF INVENTION

The present invention is a collection device that is residing in an exterior environment for the depositing of refuse material for disposal with the refuse material removed from a surface and then deposited into the collection device that utilizes a pressurized fluid flow to dispose of the refuse material by transferring the refuse material and the fluid to a sewer system. Broadly, the present invention includes, a pedestal body having a longitudinal axis that includes a pedestal first end and a pedestal second end, the pedestal body also includes an internal void to allow fluid and refuse material communication from the pedestal second end to the pedestal first end. The present invention also includes, a receptacle having a base with a surrounding sidewall extending from the base to define a receptacle interior that is separated from the exterior environment, the sidewall terminating in an opening forming a receptacle rim that communicates between the exterior environment and the receptacle interior. The sidewall also has a sidewall aperture adjacent to the opening, with the base being attached to the pedestal second end with the base having a base aperture to allow fluid and refuse material communication from the receptacle interior to the void and onward through the pedestal first end into the sewer system. Also included is a fluid nozzle that is located in the exterior environment is positioned to direct the pressurized fluid to flow from the nozzle such that the pressurized fluid when exiting the nozzle is in an open flow state over an open gap distance formed between the nozzle and the sidewall aperture, wherein the fluid flows from the nozzle over the gap distance then through the sidewall aperture and into the receptacle interior.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 6 shows a partial cross section of an expanded side or elevation view of the receptacle portion of the collection device assembly;

FIG. 7 shows a perspective view of the collection device assembly encompassing the pedestal body, receptacle, pressurized fluid nozzle, and lid shown in an open state with the collection device assembly installed on a surface and connected to a sewer system;

FIG. 8 shows a partial cross section of an expanded side or elevation view of the receptacle portion of the collection device assembly in use with the valve in an open state and fluid flowing from the nozzle having the presence of refuse material and fluid exiting the receptacle;

FIG. 9 shows a top view of the collection device assembly as depicted in FIG. 1 with the collection device assembly in use with the valve in an open state and fluid flowing from the nozzle into the receptacle interior having the presence of refuse material and fluid exiting the receptacle.

REFERENCE NUMBER IN DRAWINGS

Figures 1, 2:
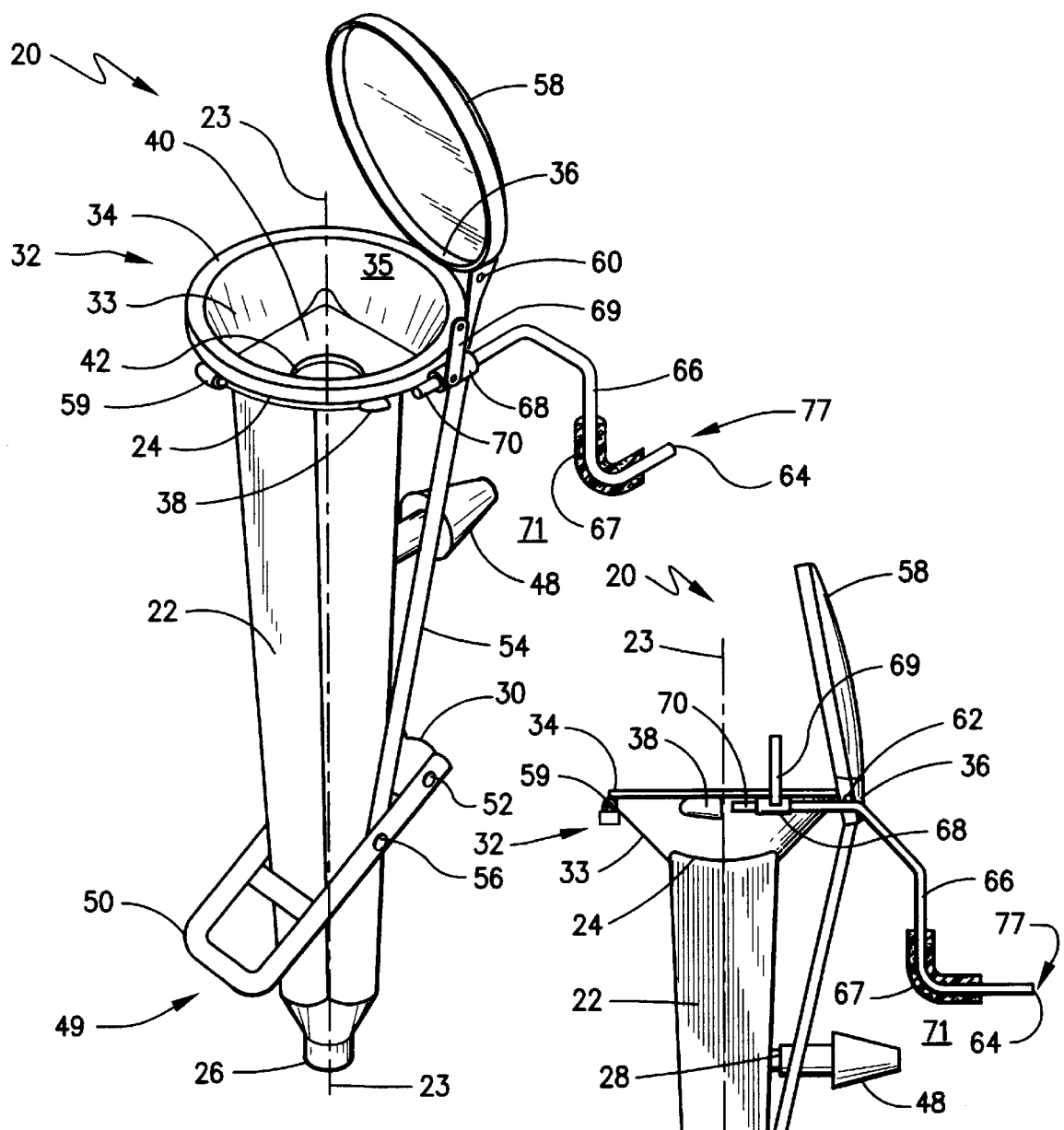
FIG. 1 shows a perspective view of the collection device assembly encompassing the pedestal body, receptacle, pressurized fluid nozzle, and lid shown in an open state.
FIG. 2 shows a side or elevation view of the collection device assembly as depicted in FIG. 1.

20 Collection Device for Depositing Refuse for Disposal
22 Pedestal body
23 Pedestal body longitudinal axis
24 Pedestal second end
25 Pedestal internal void
26 Pedestal first end
28 Pedestal sewer gas vent connection
30 Pedestal pivotal attachment boss
32 Receptacle
33 Receptacle surrounding sidewall
34 Receptacle rim
35 Receptacle interior
36 Receptacle pivotal mount for lid
37 Receptacle surrounding sidewall aperture
38 Fluid flow deflector
40 Receptacle base
42 Base aperture
44 Closure
46 Means for biasing closure in a closed state
47 Sewer gas
48 Means for venting sewer gas
49 Foot linkage assembly
50 Foot pedal
52 Foot pedal pivotal attachment to pedestal
54 Link
56 Pivotal attachment for foot pedal to link
58 Lid
59 Lid lockable element
60 Pivotal attachment for link to lid
62 Pivotal attachment for lid to receptacle rim
64 Fluid inlet for pressurized fluid flow 66 Means for fluid communication
67 Means for preventing freezing of the pressurized fluid flow
68 Valve
69 Valve lockable element
70 Fluid nozzle
71 Exterior environment
72 Surface
73 Open gap distance
74 Fluid, open flow state
75 Fluid, from pressurized state to open flow state point
76 Refuse material
77 Fluid, pressurized
78 Earth
80 Sewer system
82 Sewer tee connector
84 Sewer line riser
86 Riser connector
87 Human user hand
88 Human user
89 Human user waistline
90 Scoop
92 Human user foot

DETAILED DESCRIPTION

With initial reference to FIGS. 1–10 shown are perspective views, side views, side crossectional views, a top view, an as installed perspective view, and use views of the collection device assembly 20, encompassing the pedestal body 22, receptacle 32, pressurized fluid nozzle 70, and lid 58 shown in an open state. Generally, the present invention of the collection device 20 resides in an exterior environment 71 for the depositing of refuse material 76 for disposal with the refuse material 76 removed from a surface 72 and then deposited into the collection device 20 that utilizes a pressurized fluid flow 77 to dispose of the refuse material 76 by transferring the refuse material 76 and the fluid 74 to a sewer system 80.

Broadly, the present invention of the collection device assembly 20 includes, a pedestal body 22 having a longitudinal axis 23 that includes a pedestal first end 26 and a pedestal second end 24, the pedestal body 22 also includes an internal void 25 to allow fluid 74 and refuse material 76 communication from the pedestal second end 24 to the pedestal first end 26. The pedestal first end 26 is typically adapted to attach to the sewer system 80. The sewer system 80 can be a municipal type pipe system that utilizes a remote treatment plant, a septic tank type system, or any other type of sewer system that can acceptably take the refuse material 76 and the fluid 74. The pedestal first end 26 is adapted to attach to the sewer system 80 that is normally a pipe connection through a riser connector 86 that extends through the earth 78 in a sewer line riser 84 that is attached to a branch angled tee 82 to the sewer system 80.

Returning to the pedestal body 22 itself, the pedestal body 22 has a length that is at least long enough along the longitudinal axis 23 between the pedestal first end 26 and the pedestal second end 24 to allow an adult human user 88 to stand erect upon the surface 72 for a receptacle rim 34 and a human user waistline 89 to be at substantially the same elevation above the surface 72. The aforementioned length of the pedestal body 22 is operational to utilize a human user hand 87 with a scoop 90 for deposit of the refuse material 76 into the receptacle interior 35 reducing the need of the human user 88 to uncomfortably bend over, kneel or twist their body to place the scoop 90 that is held by the human user hand 87 with the refuse material 76 positioned in the scoop 90 into the receptacle interior 35. The pedestal body 22 as shown in the figures assumes an inverted obelisk shape, however, the pedestal body 22 could assume any number of other shapes as long as the stated conditions of operation use can be complied with. These other shapes for the pedestal body 22 could include cylindrical, elliptical, round, semicircular, rectangular, square, or any other shape that is easily manufactured and complies with the use requirements as mentioned.

Looking to the internal void portion 25 of the pedestal body 22, the internal void 25 would normally assume the same shape as the exterior of the pedestal body 22, however, this would not be a strict requirement as again for manufacturing convenience the configuration of the internal void 25 could be different then the exterior of the pedestal body 22 as long as the internal void 25 can perform the function of allowing the fluid 74 and refuse material 76 combination to communicate from the pedestal second end 24 to the pedestal first end 26. As far as materials of construction and method of manufacture for the pedestal body 22, this would typically be by a molding process utilizing either polyethylene, polypropylene, polyurethane, or any other plastic or fiberglass type materials that would be suitable for use in an external environment and for contact with the fluid 74 and refuse material 76 combination. In addition, metallic materials that are fabricated would also be acceptable such as a stainless steel, or a coated or treated carbon steel, or any other steel suitable for the aforementioned conditions.

The present invention also includes, a receptacle 32 having a base 40 with a surrounding sidewall 33 extending from the base 40 to define a receptacle interior 35 that is separated from the exterior environment 71. The sidewall 33 terminates in an opening forming a receptacle rim 34 that communicates between the exterior environment 71 and the receptacle interior 35. The sidewall 33 also has a sidewall aperture 37 adjacent to the opening, with the base 40 being attached to the pedestal second end 24 with the base 40 also having a base aperture 42 to allow fluid 74 and refuse material 76 communication from the receptacle interior 35 to the void 25 and onward through the pedestal first end 26 and into the sewer system 80. The receptacle 32 as shown in the figures assumes a circular shape, however, the receptacle 32 could assume any number of other shapes as long as the stated conditions of operation use can be complied with. These other shapes for the receptacle 32 could include elliptical, semicircular, rectangular, square, or any other shape that is easily manufactured and complies with the use requirements as mentioned.

As far as the receptacle interior 35 of the receptacle 32, the receptacle interior 35 would normally assume the same shape as the exterior of the receptacle 32. However, this would not be a strict requirement as again for manufacturing convenience the configuration of the receptacle interior 35 could be different then the exterior of the receptacle 32 as long as the receptacle interior 35 can perform the function of allowing the fluid 74 and refuse material 76 combination to be deposited into receptacle interior 35 to communicate from the receptacle interior 35 to the pedestal second end 24 through the pedestal void 25 and on to the pedestal first end 26. For materials of construction and method of manufacture for the receptacle 32, this would typically be by a molding process utilizing either polyethylene, polypropylene, polyurethane, or any other plastic or fiberglass type materials that would be suitable for use in an external environment and for contact with the fluid 74 and refuse material 76 combination. In addition, metallic materials that are fabricated would also be acceptable such as a stainless steel, or a coated or treated carbon steel, or any other steel suitable for the aforementioned conditions.

Also included in the collection device assembly 20, is a fluid nozzle 70 that is located in the exterior environment 71 that is positioned to direct the pressurized fluid 77 to flow from the nozzle 70 positioned such that the pressurized fluid 77 when exiting the nozzle 70 transitions from a pressurized state into an open flow state 75 and remains in an open flow state 74 over an open gap distance 73 formed between the nozzle 70 and the sidewall aperture 37, wherein the fluid flows in an open flow state 74 from the nozzle 70 over the gap distance 73 then through the sidewall aperture 37 and into the receptacle interior 35. For compliance with building code requirements the gap distance 73 is normally at least one (1) inch to provide an anti siphon protection to prevent sewage from backing up into the nozzle 70 and reverse flowing into the pressurized fluid 77 even if the pressurized fluid 77 should become unpressurized.

Looking at materials of construction and method of manufacture for the fluid nozzle 70, this would typically be by a molding process utilizing either polyethylene, polypropylene, polyurethane, or any other plastic or fiberglass type materials that would be suitable for use in an external environment, for contact with the fluid 74, and for the pressure of the pressurized fluid 77 being about 30 to 60 pounds per square inch gage (psig) being standard municipal water system pressure. However, as needs dictate of the pressurized fluid 77 having a higher pressure or not being water, in other words another fluid, the fluid nozzle 70 would be designed to accommodate other fluids and/or higher pressures. In addition, metallic materials that are fabricated would also be acceptable such as a stainless steel, or a coated or treated carbon steel, or any other steel suitable for the aforementioned conditions.

The collection device 20 for depositing refuse 76 for disposal optionally further includes a fluid flow deflector 38 that is adjacent to the sidewall aperture 37, the deflector 38 as shown is located in the exterior environment 71 and is operational to direct and diffuse the open state fluid flow 74 from the positioned nozzle 70 down stream of the open gap distance 73 into the sidewall aperture 37 for diffusion of the open state fluid flow 74 as shown in FIG. 9 into the receptacle interior 35. As far as materials of construction and method of manufacture for the fluid flow deflector 38, this would typically be by a molding process utilizing either polyethylene, polypropylene, polyurethane, or any other plastic or fiberglass type materials that would be suitable for use in an external environment, contact with the fluid 74, and for the kinetic impact of the fluid in the open flow state 74 coming from the fluid nozzle 70. In addition, metallic materials that are fabricated would also be acceptable such as a stainless steel, or a coated or treated carbon steel, or any other steel suitable for the aforementioned conditions. As the fluid flow deflector 38 is adjacent to the sidewall aperture 37, the deflector 38 can be attached to the receptacle sidewall 33 by any method that is fluid proof between the fluid flow deflector 38 and the sidewall 33, such as being integral, glued, attached by fasteners, or any other method that meets the aforementioned conditions for the fluid flow deflector 38 to form a fluid proof seal around the sidewall aperture 37 where the fluid flow detector 38 and the sidewall 33 are adjacent to each other.

The collection device 20 for depositing refuse 76 for disposal also optionally further includes a valve 68 that is in fluid communication with the nozzle 70, the valve 68 is located upstream of the nozzle 70, with the valve 68 being operational to allow pressurized fluid flow 77 in a valve 68 open state as shown in FIGS. 8 and 9, and the valve is also operational to restrict pressurized fluid flow 77 in a valve closed state as shown in FIG. 7. The valve 68 can be any type that is compatible material wise with the pressurized fluid 77 and also has an adequate pressure retaining capability for the pressure level of the pressurized fluid 77 being about 30 to 60 pounds per square inch gage (psig) being standard municipal water system pressure. However, as needs dictate of the pressurized fluid 77 having a higher pressure or not being water, in other words another fluid, the valve 68 would be designed to accommodate higher pressures and/or contact with other fluids. Preferably the valve 68 is an inline conventional ball type, however, gate, plug, or other valve types are acceptable that can meet the stated operating conditions for the valve 68. Also, if desired a valve lockable element 69 can be included that is adapted to engage the valve 68 and be secured thereto, securing the valve 68 in the closed state when the valve lockable element 69 is in a locked state, the valve lockable element 69 allows the valve 68 to be placed in the open state when the valve lockable element 69 is in an unlocked state. The valve lockable element 69 is preferably a padlock type, or any suitable alternative for operation in an exterior environment.

Figure 3:
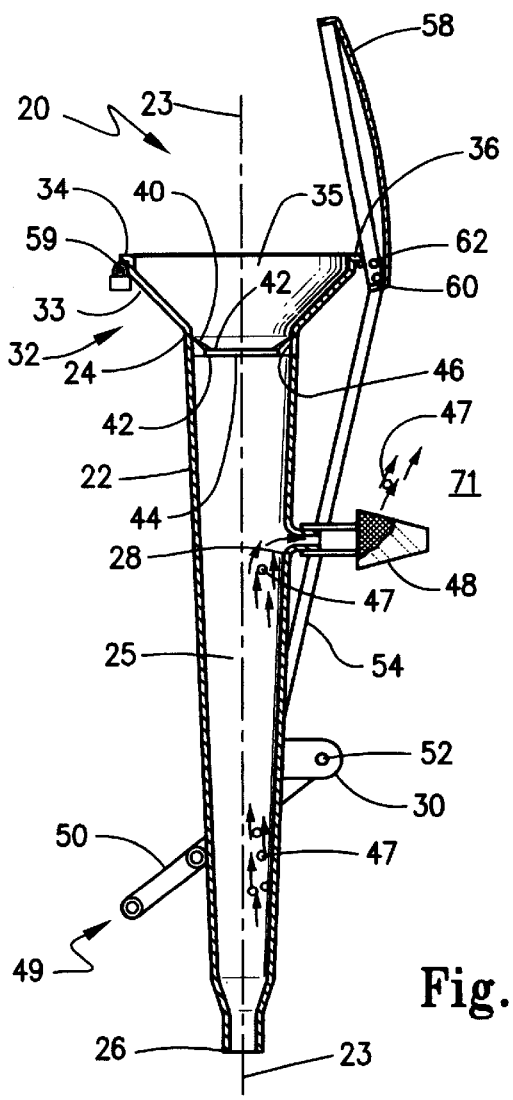
FIG. 3 shows a cross section side or elevation view of the collection device assembly as depicted in FIG. 1.
Figure 4:
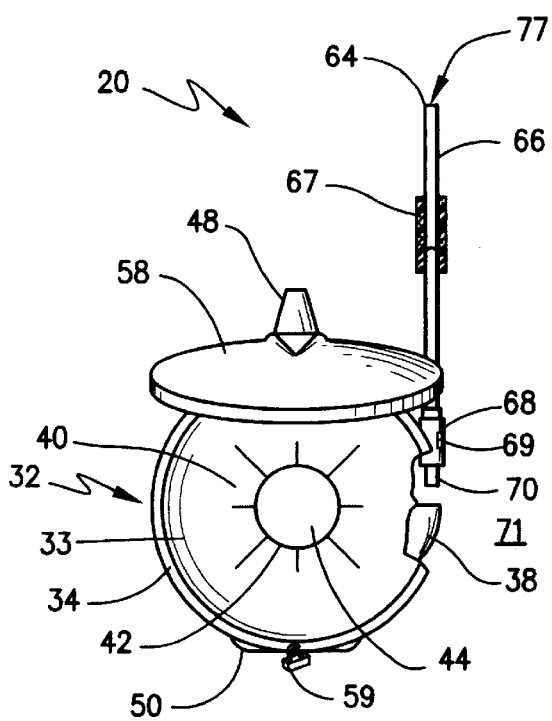
FIG. 4 shows a top view of the collection device assembly as depicted in FIG. 1.
Figure 5:
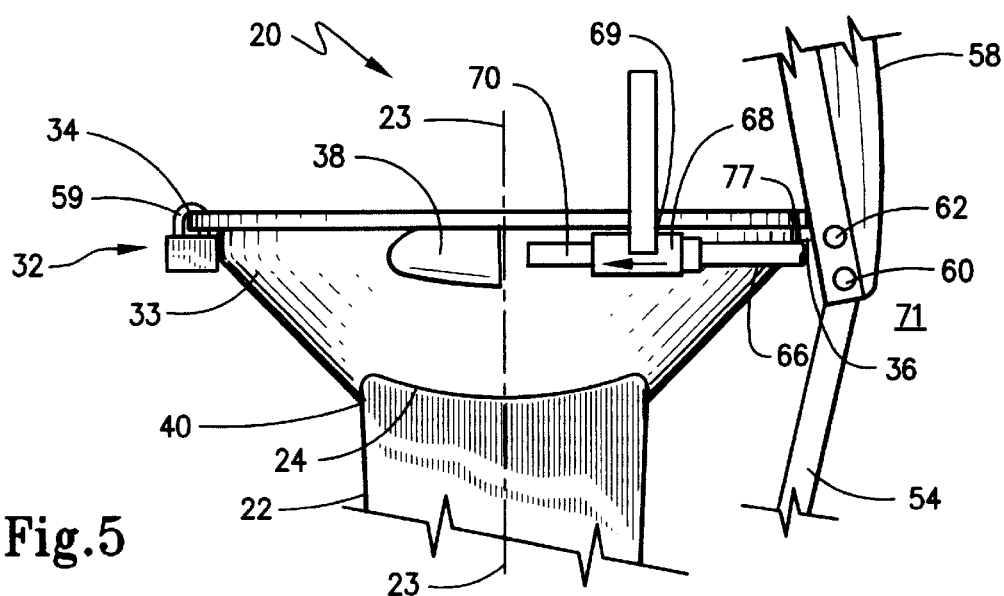
FIG. 5 shows an expanded side or elevation view of the receptacle portion of the collection device assembly.

Another optional element for the collection device 20 for depositing refuse 76 for disposal is a means 48 for venting sewer gas 47, that is attached to the pedestal body 22 at a pedestal sewer gas vent connection 28, the means 48 for venting sewer gas 47 is operational for venting sewer gas 47 by being in fluid communication with the void 25 to the exterior environment 71 as shown in FIG. 3. The means 48 for venting sewer gas 47, is preferably a conventional screen and/or filter type or any suitable equivalent for the stated conditions of use.

Also, another optional element element for the collection device 20 for depositing refuse 76 is a closure 44 in the base aperture 42, the closure 44 is operational to open upon the presence of the refuse material 76 and open state fluid flow 74 in the base aperture 42 with the closure 44 being in an open state as shown in FIG. 8. The closure 44 is also operational to close the base aperture 42 once the refuse material 76 and open state fluid flow 74 have communicated into the void 25 with the closure 44 then returning to a closed state as shown in FIGS. 3 and 6. Materials of construction and method of manufacture for the closure 44, would typically be by a molding process utilizing either polyethylene, polypropylene, polyurethane, or any other plastic or fiberglass type materials that would be suitable for use in an external environment, for contact with the fluid 74 and the refuse material 76, and for the kinetic impact of the fluid 74 and the refuse material 76 being deposited into the receptacle interior 35 by the human user 88. In addition, metallic materials that are fabricated would also be acceptable such as a stainless steel, or a coated or treated carbon steel, or any other steel suitable for the aforementioned conditions. The seal between the closure 44 and the base aperture 42 when the closure 44 is in the closed state does not need to be absolutely fluid tight. The closure 44 utilizes a means 46 for biasing the closure 44 in the closed state that is preferably a piece of resilient material that is resistant to corrosion of the refuse material 76 and open state fluid flow 74 and is suitable for being in an exterior environment 71. The preferred materials of construction for the means 46 for biasing the closure 44 are similar to the closure 44 materials of construction or any suitable equivalent meeting the aforementioned operational conditions.

For additional exterior environment weather resistance, the collection device 20 for depositing refuse 76 can have a lid 58 added that is pivotally attached 62 to the receptacle rim 34 utilizing a receptacle pivotal mount 36, with the lid 58 being operational to close the receptacle opening placing the lid 58 in a closed state with the lid 58 also being operational to open the receptacle opening by being in an open state. The lid 58 can matingly engage, however, not being required to be a fluid tight seal, the receptacle rim 34 while in a closed state and thus the lid 58 and the receptacle rim 34 would assume the same shape which may be circular in shape, however, as long as the lid 58 and the receptacle rim 34 are of the same shape they could matingly engage as elliptical, oblong, semicircular, square, rectangular, or any other shape. Looking at materials of construction and method of manufacture for the lid 58, this would typically be by a molding process utilizing either polyethylene, polypropylene, polyurethane, or any other plastic or fiberglass type materials that would be suitable for use in an external environment, for contact with the fluid 74 and the refuse material 76. In addition, metallic materials that are fabricated would also be acceptable such as a stainless steel, or a coated or treated carbon steel, or any other steel suitable for the aforementioned conditions.

Also, if desired a lid lockable element 59 can be added that is adapted to engage the lid 58 and the receptacle rim 34 to secure the lid 58 in the closed state when the lid lockable element 59 is in a locked state, the lid lockable element 59 is adapted to disengage the lid 58 and the receptacle rim 34 when in an unlocked state. The lid lockable element 59 is preferably in the form of a padlock that is either key or combination operated between the locked state or unlocked state, however, any other type of lockable element that can securely engage the lid 58 and the receptacle rim 34 as described above would be acceptable that can operate in an exterior environment.

For added convenience to the human user 88 the collection device 20 may also incorporate a foot linkage assembly 49 including a foot pedal 50 that is pivotally attached to the pedestal body 22 at a pedestal pivotal attachment boss 30 and a foot pedal pivotal attachment to pedestal 52, additionally the foot pedal 50 is pivotally attached 56 to a link 54 that is also pivotally attached 60 to the lid 58. The foot linkage assembly 49 is operational to allow a human user foot 92 to open the lid 58, placing the lid 58 in the open state from placing the human user foot 92 upon the foot pedal 50 and pushing the foot pedal 50 towards the surface 72. Preferably, the foot pedal 50 is sized and adapted to be stepped on by a human user foot 92. The foot linkage assembly 49 is balanced geometry wise such that a means for placing the lid 58 in the closed state upon removal of the human foot 92 from the foot pedal 50 of the foot linkage assembly 49 allows the lid 58 to default into the closed state from the force of gravity. This results in the foot linkage assembly 49 moving in conjunction with the lid 58 to allow the human user 88 to merely remove their foot 92 from the foot pedal 50 for the lid 58 to return to the closed state.

As far as materials of construction and method of manufacture for the foot linkage assembly 49, which includes a foot pedal 50 and the link 54, this would typically be by a molding process utilizing either polyethylene, polypropylene, polyurethane, or any other plastic or fiberglass type materials that would be suitable for use in an external environment. In addition, metallic materials that are fabricated would also be acceptable such as a stainless steel, or a coated or treated carbon steel, or any other steel suitable for the aforementioned conditions. The pivotal attachments being a foot pedal pivotal attachment to pedestal 52, the foot pedal 50 that is pivotally attached 56 to a link 54 that is also pivotally attached 60 to the lid 58 can be constructed of the same materials as the foot pedal 50 and link 54.

Given that the collection device 20 resides in the exterior environment, and depending upon location it may be desired to use the collection device 20 in cold climates wherein a means 67 for preventing freezing of the pressurized fluid flow would be beneficial. The means 67 for preventing freezing of the pressurized fluid flow is located on a means 66 for fluid communication that extends from a fluid inlet for pressurized flow 64 to the valve 68, in other words the freezing protection would be required from the fluid inlet for pressurized flow 64 continuing on to the valve 68 along the means 66 for fluid communication, wherein the pressurized fluid 77 would be exposed to freezing temperatures with the valve 68 in the valve closed state. The means 66 for fluid communication can be a conventional pipe, a flexible type of fluid line such as a hose, constructed of materials suitable for contact with the pressurized fluid 77, exterior environment temperatures, and the static pressure of the pressurized fluid being about 30 to 60 pounds per square inch gage (psig) being standard municipal water system pressure.

However, higher or lower pressures are acceptable and would be designed to for the means 66 for fluid communication depending upon the location and availability of the pressurized fluid, such as in a rural area a gravity feed overhead tank may be used, or a pump from a well could be used. The pressurized fluid 77 is normally water, however, any fluid including liquids and gases that are available and are compatible with the sewer system 80 would be acceptable for use with the collection device 20. The means 67 for preventing freezing of the pressurized fluid flow is preferably a conventional electrical heat tape that wraps around a pipe or flexible hose, and can also utilize conventional pipe or flexible hose insulation in conjunction with the electrical heat tape to minimize heat tape power consumption. However, depending upon the location of the collection device 20, conventional pipe or flexible hose type of insulation alone may be suitable or even the use of an antifreeze solution in the pressurized fluid 77 to preclude the need for any type of electrical heat tape of the pipe or flexible hose insulation would be acceptable as long as the antifreeze solution is compatible with the sewer system 80.

METHOD OF USE

Figure 10:
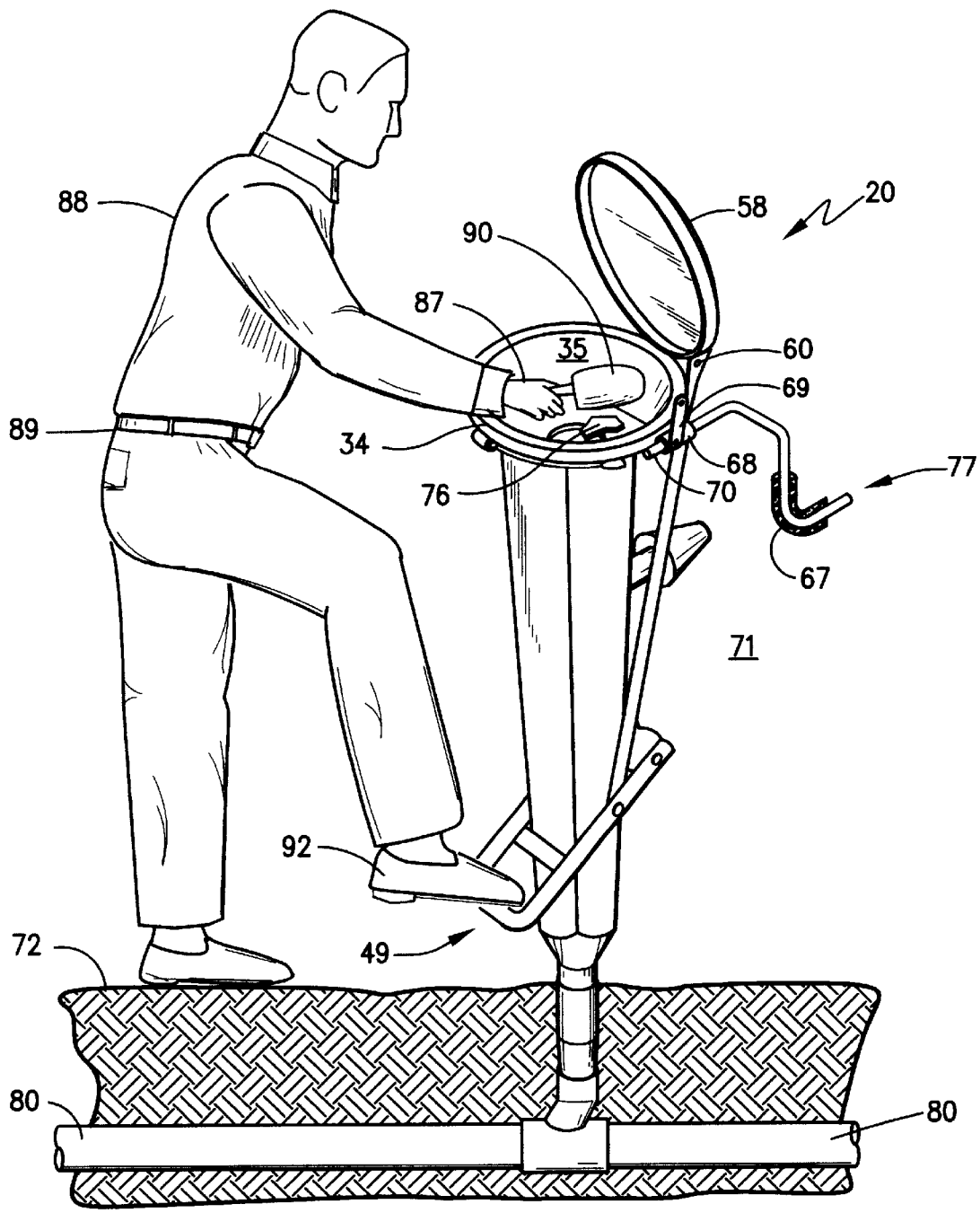
FIG. 10 shows a perspective view of the collection device assembly in use encompassing the pedestal body, receptacle, pressurized fluid nozzle, and lid shown in an open state with a human user utilizing a foot linkage assembly to place the lid into the open state while using a hand held scoop to place the refuse material into the receptacle interior.

Referring to FIG. 10 shown is a perspective view of the collection device assembly 20 in use encompassing the pedestal body 22, the receptacle 32, pressurized fluid nozzle 70, and lid 58 depicted in an open state with a human user 88 utilizing the foot linkage assembly 49 to place the lid 58 into the open state while using a hand held scoop 90 to place the refuse material 76 into the receptacle interior 35. Normally to start the user 88 removes the refuse material 76 from the surface 72 utilizing the scoop 90 and then deposits the refuse material 76 into the receptacle interior 35. For user 88 convenience the receptacle rim 34 is about the same height as the users waist 89 lessening the need for the user 88 to stoop or bend over excessively while depositing the refuse material 76 into the receptacle interior 35. Optionally, if the collection device assembly 20 has a lid 58 or also optionally the foot linkage assembly 49 the user 88 would either manually open the lid 58 or the user 88 would place their foot 92 upon the foot linkage assembly 49 and push downward toward the surface 72 with their foot 92 to automatically open the lid 58 prior to depositing the refuse material 76.

Once the refuse material 76 is deposited into the receptacle interior 35, the next step would be for the user 88 to either manually shut the lid 58 placing it in a closed state on top of and matingly engaging the receptacle rim 34 or the user 88 would remove their foot 92 from the foot linkage assembly 49 wherein the lid 58 would automatically default into a closed state from gravity. Subsequently, the user 88 would place the valve 68 into the open valve state to initiate the pressurized fluid flow 77 out of the nozzle 70, at this point the pressurized fluid flow 77 would flow across the open gap 73 with the fluid transforming from a pressurized state to an open flow state 75. The valve 68 could be dispensed with, wherein the pressurized fluid flow 77 out of the nozzle 70 would be continuous. The open flow state fluid 74 would then impinge upon the deflector 38 flowing through the receptacle surrounding sidewall aperture 37 and be dispersed into the receptacle interior 35 as best shown in FIG. 9, wherein the open state fluid flow 74 and the refuse material 76 will eventually flow into the sewer system 80. Also, optionally, the deflector 38 could be dispensed with, wherein the open state fluid flow 74 would flow from the nozzle 70 positioned to flow across the open gap 73 and into the receptacle surrounding sidewall aperture 37 continuing into the receptacle interior 35.

CONCLUSION

Accordingly, the present invention of a collection device for depositing refuse for disposal has been described with some degree of particularity directed to the embodiments of the present invention. It should be appreciated, though, that the present invention is defined by the following claims construed in light of the prior art so modifications the changes may be made to the exemplary embodiments of the present invention without departing from the inventive concepts contained therein.

What is claimed is:

1. A collection device residing in an exterior environment for depositing refuse for disposal with the refuse material removed from a surface and then deposited into said collection device that utilizes a pressurized fluid flow to dispose of the refuse material by transferring the refuse material and a fluid to a sewer system, comprising:
    (a) a pedestal body having a longitudinal axis that includes a pedestal first end and a pedestal second end, said pedestal body includes an internal void to allow fluid and refuse material communication from said pedestal second end to said pedestal first end;
    (b) a receptacle including a base with a surrounding sidewall extending from said base to define a receptacle interior separated from the exterior environment, said sidewall terminating in an opening forming a receptacle rim that communicates between said exterior environment and said receptacle interior, said sidewall having a sidewall aperture adjacent to said opening, said base attached to said pedestal second end with said base having a base aperture to allow fluid and refuse material communication from said receptacle interior to said void and onward through said pedestal first end into the sewer system; and
    (c) a fluid nozzle located in the exterior environment positioned to direct the pressurized fluid to flow from said nozzle such that the pressurized fluid when exiting said nozzle is in an open flow state over an open gap distance formed between said nozzle and said sidewall aperture, wherein the fluid flows from said nozzle over the gap distance then through said sidewall aperture and into said receptacle interior.

2. A collection device for depositing refuse for disposal according to claim 1 further comprising a fluid flow deflector adjacent to said sidewall aperture, said deflector is located in the exterior environment and is operational to direct the open state fluid flow from said nozzle down stream of the open gap distance into said sidewall aperture for diffusion of the open state fluid flow into said receptacle interior.

3. A collection device for depositing refuse for disposal according to claim 1 further comprising a valve in fluid communication with said nozzle, said valve located upstream of said nozzle, said valve is operational to allow pressurized fluid flow in a valve open state and to restrict pressurized fluid flow in a valve closed state.

4. A collection device for depositing refuse for disposal according to claim 3 further comprising a valve lockable element that is adapted to engage said valve and be secured thereto securing said valve in the closed state when said valve lockable element is in a locked state, said valve lockable element allowing said valve to be placed in the open state when said valve lockable element is in an unlocked state.

5. A collection device for depositing refuse for disposal according to claim 1 further comprising a means for venting sewer gas, that is attached to said pedestal body, said means for venting sewer gas is operational for venting sewer gas by being in fluid communication with said void to the exterior environment.

6. A collection device for depositing refuse for disposal according to claim 5 further comprising a closure in said base aperture, said closure is operational to open upon the presence of the refuse material and open state fluid flow in said base aperture with said closure being in an open state and said closure is operational to close said base aperture once the refuse material and open state fluid flow have communicated into said void with said closure then returning to a closed state utilizing a means for biasing said closure in the closed state.

7. A collection device for depositing refuse for disposal according to claim 5 further comprising a lid pivotally attached to said receptacle rim, said lid is operational to close said receptacle opening being in a closed state and said lid is operational to open said receptacle opening being in an open state.

8. A collection device for depositing refuse for disposal according to claim 7 further comprising a foot linkage assembly pivotally attached to said pedestal body and pivotally attached to said lid, said foot linkage assembly is operational to allow a human foot to open said lid from said foot linkage assembly placing said lid in the open state.

9. A collection device for depositing refuse for disposal according to claim 8 further comprising a means for placing said lid in the closed state upon removal of the human foot from said foot linkage assembly.

10. A collection device for depositing refuse for disposal according to claim 7 further comprising a lid lockable element that is adapted to engage said lid and said receptacle rim to secure said lid in the closed state when said lid lockable element is in a locked state, said lid lockable element is adapted to disengage said lid and said receptacle rim when in an unlocked state.

11. A collection device for depositing refuse for disposal according to claim 1 wherein said pedestal first end is adapted to attach to the sewer system.

12. A collection device for depositing refuse for disposal according to claim 1 further comprising a means for preventing freezing of the pressurized fluid flow.

13. A collection device for depositing refuse for disposal according to claim 1 wherein said pedestal body has a length that is at least long enough along said longitudinal axis between said pedestal first end and said pedestal second end to allow an adult human user to stand erect upon the surface for said receptacle rim and a human user waistline to be at substantially the same elevation above the surface, operational to utilize a human user hand with a scoop for deposit of the refuse material into said receptacle interior.

14. A collection device residing in an exterior environment for depositing refuse for disposal with the refuse material removed from a surface and then deposited into said collection device that utilizes a pressurized fluid flow to dispose of the refuse material by transferring the refuse material and a fluid to a sewer system, comprising:

(a) a cylindrical pedestal body having a longitudinal axis that includes a pedestal first end and a pedestal second end, said pedestal body includes an internal cylindrical void to allow fluid and refuse material communication from said pedestal second end to said pedestal first end;

(b) a receptacle including a base with a circular surrounding sidewall extending from said base to define a receptacle interior separated from the exterior environment, said circular sidewall terminating in an opening forming a circular receptacle rim that communicates between said exterior environment and said receptacle interior, said sidewall having a sidewall aperture adjacent to said opening, said base attached to said pedestal second end with said base having a base aperture to allow fluid and refuse material communication from said receptacle interior to said void and onward through said pedestal first end into the sewer system; and (c) a fluid nozzle located in the exterior environment positioned to direct the pressurized fluid to flow from said nozzle such that the pressurized fluid when exiting said nozzle is in an open flow state over an open gap distance formed between said nozzle and said sidewall aperture, wherein the fluid flows from said nozzle over the gap distance then through said sidewall aperture and into said receptacle interior.

15. A collection device for depositing refuse for disposal according to claim 14 further comprising a fluid flow deflector adjacent to said sidewall aperture, said deflector is located in the exterior environment and is operational to direct the open state fluid flow from said nozzle down stream of the open gap distance into said sidewall aperture for diffusion of the open state fluid flow into said receptacle interior.

16. A collection device for depositing refuse for disposal according to claim 14 further comprising a valve in fluid communication with said nozzle, said valve located upstream of said nozzle, said valve is operational to allow pressurized fluid flow in a valve open state and to restrict pressurized fluid flow in a valve closed state.

17. A collection device for depositing refuse for disposal according to claim 14 further comprising a means for venting sewer gas, that is attached to said pedestal body, said means for venting sewer gas is operational for venting sewer gas by being in fluid communication with said void to the exterior environment.

18. A collection device for depositing refuse for disposal according to claim 17 further comprising a closure in said base aperture, said closure is operational to open upon the presence of the refuse material and open state fluid flow in said base aperture with said closure being in an open state and said closure is operational to close said base aperture once the refuse material and open state fluid flow have communicated into said void with said closure then returning to a closed state utilizing a means for biasing said closure in the closed state.

19. A collection device for depositing refuse for disposal according to claim 17 further comprising a circular lid pivotally attached to said receptacle rim, said lid is operational to close said receptacle opening and is matingly engagable with said receptacle rim being in a closed state and said lid is operational to open said receptacle opening being in an open state.

20. A collection device for depositing refuse for disposal according to claim 19 further comprising a foot linkage assembly that is sized and adapted to be stepped on by a human foot, said foot linkage assembly is pivotally attached to said pedestal body and pivotally attached to said lid, said foot linkage assembly is operational to allow a human foot to open said lid from said foot linkage assembly placing said lid in the open state.

21. A collection device for depositing refuse for disposal according to claim 20 further comprising a means for placing said lid in the closed state upon removal of the human foot from said foot linkage assembly.

22. A collection device for depositing refuse for disposal according to claim 14 wherein said pedestal body has a length that is at least long enough along said longitudinal axis between said pedestal first end and said pedestal second end to allow an adult human user to stand erect upon the surface for said receptacle rim and a human user waistline to be at substantially the same elevation above the surface, operational to utilize a human user hand with a scoop for deposit of the refuse material into said receptacle interior.

* * * * *